United States Patent
Ofek et al.

(10) Patent No.: US 8,954,266 B2
(45) Date of Patent: Feb. 10, 2015

(54) PROVIDING ROUTES THROUGH INFORMATION COLLECTION AND RETRIEVAL

(75) Inventors: Eyal Ofek, Redmond, WA (US); Jeffrey Couckuyt, Bothell, WA (US); Gur Kimchi, Bellevue, WA (US); Brian Beckman, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 13/171,393

(22) Filed: Jun. 28, 2011

(65) Prior Publication Data

US 2013/0006517 A1 Jan. 3, 2013

(51) Int. Cl.
G01C 21/00 (2006.01)
G01C 21/34 (2006.01)

(52) U.S. Cl.
CPC .................. *G01C 21/3446* (2013.01)
USPC ........... 701/424; 701/400; 701/408; 701/409; 701/410; 701/411

(58) Field of Classification Search
CPC ............... G01C 21/34; G01C 21/3415; G01C 21/3453; G01C 21/3484
USPC ......... 701/411, 423, 409, 410, 420, 422, 424, 701/425
See application file for complete search history.

(56) References Cited

U.S. PATENT DOCUMENTS

| | | | |
|---|---|---|---|
| 6,622,090 B2 | 9/2003 | Lin | |
| 6,952,815 B2 | 10/2005 | Teig et al. | |
| 7,124,199 B2 | 10/2006 | Miller et al. | |
| 7,606,781 B2 | 10/2009 | Sweeney et al. | |
| 7,698,061 B2 * | 4/2010 | Singh | ............................ 701/420 |
| 7,773,634 B1 | 8/2010 | Machiraju | |
| 7,908,280 B2 | 3/2011 | Frank et al. | |

(Continued)

FOREIGN PATENT DOCUMENTS

| | | |
|---|---|---|
| JP | 2008292229 A | 12/2008 |
| KR | 100926681 B1 | 11/2009 |

OTHER PUBLICATIONS

Schmid, et al., "Extracting Places from Location Data Streams", Retrieved at <<http://citeseerx.ist.psu.edu/viewdoc/download-?doi=10.1.1.65.6928&rep=rep1&type=pdf Date: 2006>>, Proceedings of Second International Workshop on Ubiquitous Geographical Information Services, 2006, 7 pages.

(Continued)

*Primary Examiner* — Khoi Tran
*Assistant Examiner* — Robert Nguyen
(74) *Attorney, Agent, or Firm* — Steven Spellman; Jim Ross; Micky Minhas

(57) ABSTRACT

Providing directions from point A to point B may be treated as an information retrieval problem. In one example, actual routes that are traveled by people are received, and are stored in a database. When a person requests directions from point A to point B, a system searches the database to determine whether a route from A to B exists. If the route does exist, then the route may be provided as directions in response to the request. If no such route exists, then the system looks in the database for routes that have some amount of overlap with each other, and attempts to construct a route from A to B by joining known routes that overlap with each other. Rules may govern the degree of overlap that routes are to have before they can be joined.

20 Claims, 6 Drawing Sheets

(56) References Cited

U.S. PATENT DOCUMENTS

| | | | |
|---|---|---|---|
| 8,219,316 B2* | 7/2012 | Goel | 701/422 |
| 2004/0030495 A1* | 2/2004 | Draeger et al. | 701/209 |
| 2007/0073894 A1 | 3/2007 | Erickson et al. | |
| 2009/0157311 A1 | 6/2009 | Seltzer et al. | |
| 2009/0241040 A1 | 9/2009 | Mattila et al. | |
| 2010/0036606 A1* | 2/2010 | Jones | 701/202 |
| 2010/0125411 A1* | 5/2010 | Goel | 701/209 |
| 2010/0292916 A1* | 11/2010 | Kurciska et al. | 701/201 |
| 2011/0125559 A1 | 5/2011 | Nortrup | |
| 2012/0046860 A1* | 2/2012 | Curtis et al. | 701/418 |

OTHER PUBLICATIONS

Blatz, et al., "Confidence Estimation for Machine Translation", Retrieved at <<http://www.cis.upenn.edu/~kulesza/pubs/confest_report04.pdf>>, Proceedings of the 20th international conference on Computational Linguistics, Mar. 29, 2004, 113 pages (cover sheet plus pp. 1 through 112).

Letchner, et al., "Trip Router with Individualized Preferences (TRIP): Incorporating Personalization into Route Planning", Retrieved at <<ftp://ftp.cs.pitt.edu/web/projects/nlp/conf/aaai2006/17/AAAI06-297.pdf >>, in Proceedings of The Twenty-First National Conference on Artificial Intelligence and the Eighteenth Innovative Applications of Artificial Intelligence Conference, Jul. 16-20, 2006, 1795-1800.

"International Search Report and Written Opinion of the International Searching Authority", Mailed Date: Dec. 17, 2012, Application No. PCT/US2012/040626, Filed Date: Jun. 2, 2012, 10 pages.

* cited by examiner

PROVIDING ROUTES THROUGH INFORMATION COLLECTION AND RETRIEVAL

BACKGROUND

Many systems provide driving, walking, or public transit directions. Web sites, such as BING Maps and MapQuest, can provide these types of directions from one place to another. There are also various standalone systems, such as automobile navigation boxes and dashboard consoles, that likewise can provide directions. Normally, the problem of finding directions from one point to another is solved by using an edge-weighted directed graph that represents a map, and applying an algorithm such as Dijkstra's algorithm or A* to find the lowest-cost path through the graph.

A problem with providing directions in this way is that doing so presumes that the graph has correct connectivity information, and is up-to-date. Connectivity refers to the property that branches on the graph correctly represent turns that can be made in real-life geography. For example, if nodes A, B, and C represent places on a map, and if the graph shows that, from node A, one can branch either to node B or to node C, then it is assumed that it is possible in real life to take either branch. If turns corresponding to these branches cannot be made in real-life, then the connectivity information in the graph is incorrect. Moreover, in real life, roads are added, or closed for construction, or realigned, so the information in the graph may become out of date.

Digital map providers expend resources attempting to keep their graphs correct and up-to-date. But it can be difficult to do so, and many directions that are provided using their techniques can be incorrect.

SUMMARY

Information about routes that exist can be collected continually based on routes that people actually travel. These routes can be stored. When a person requests directions, the routes can be retrieved in real-time to provide directions. When there is no complete route from point A to point B in storage, routes that do exist in storage can be patched together to create a complete route, as long as they overlap with each other in ways that meet certain properties. In this way, the problem of providing directions is effectively reduced to an information retrieval problem rather than a calculation from an abstract graph. Using routes that people have traveled makes the information about what routes exist more reliable. Moreover, since the information about what routes people travel may be collected continually, the information about what routes are available is likely to be up-to-date.

In order to collect information about routes that people travel, it is observed that many people carry devices that can pinpoint their location—e.g., navigation boxes, smart phones equipped with global positioning system (GPS) receivers, and the like. While some people may choose, in the interest of privacy, to turn off these features, other people may be willing to "opt-in" to having the device continually determine their location and to have this information collected by a service. If enough people are willing to have this type of information collected, the raw geographic coordinates that are collected provide continually-updating information about what routes people travel. Moreover, since the information collected represents actual routes, the information provides continual verification of what turns that appear on a map actually can be made in real life, how long it takes to travel the routes, how the travel time and availability of turns correlates with the time of day, how travel time and turn availability correlates with the number of people in a vehicle, and other factors.

When a database of routes is collected, the database may be used to respond to requests for directions. If someone requests a route from point A to point B, the database may be searched to determine whether such a route is stored in the database. If the route is stored, it may be retrieved and provided as directions. If such a route does not exist in storage, then the database could be searched to find the longest route that runs from near point A to near point B (or, in one example, the longest route that have been corroborated in the sense that the legs of the long route coincide with shorter routes), and the database could then be searched to find routes that run from the entry and exit points of this long route to the actual points A and B. In practice, the process may first look for a long route, and then may look for successively smaller routes to be patched together until a complete set of directions is created.

Since turns that exist on a map may or may not exist in real life, a system that combines partial routes to create a complete route may insist that routes to be joined share some number of turns in common. Such a condition prevents the system from providing routes that have not been verified in real life. It is noted that this criterion for joining routes may be used regardless of whether the routes are determined through real-life data as described above, or are merely routes that have been calculated from an abstract representation of the relevant geography.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
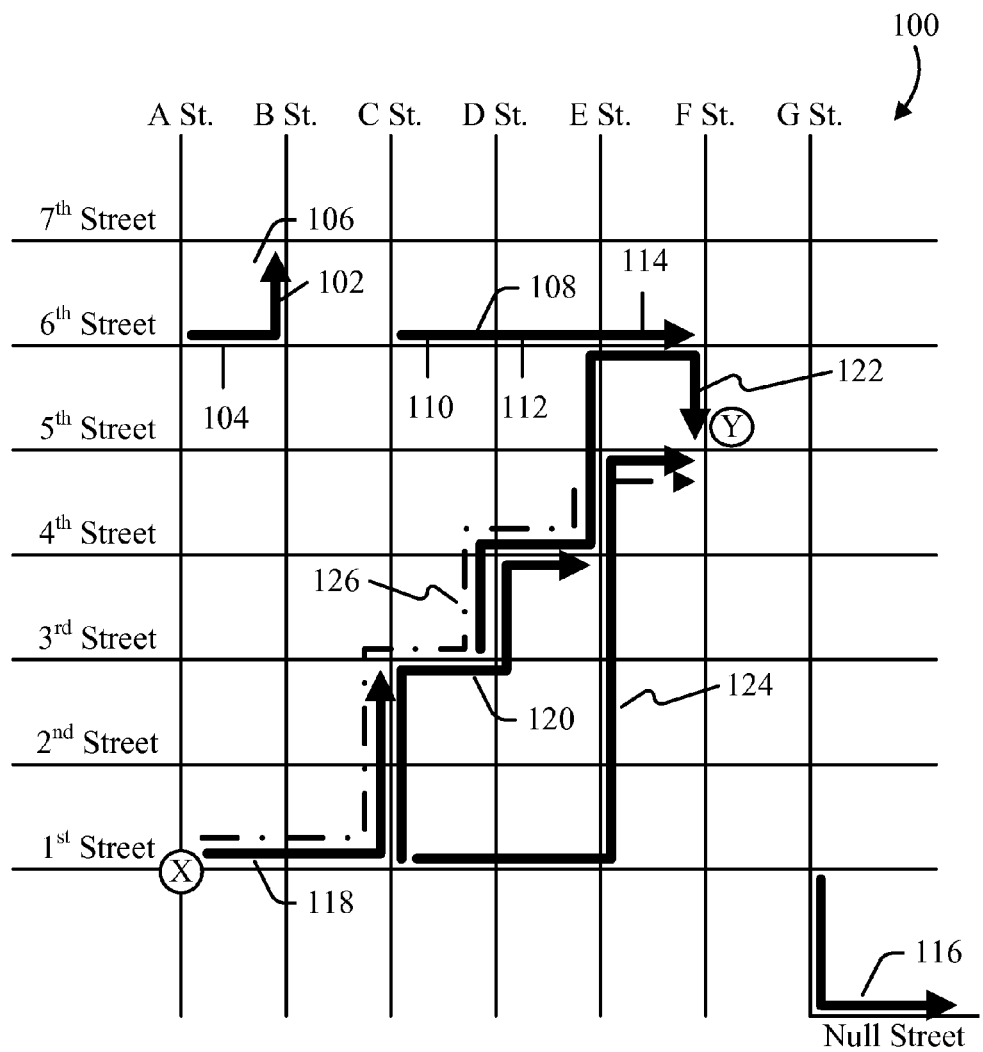
FIG. 1 is a block diagram of an example map on which routes can be traveled.

Many systems provide directions from point A to point B. For example, web sites such as BING Maps and MapQuest, can provide driving, walking, or public transit directions between arbitrary locations on a map. Automobile navigation boxes and dashboard navigation consoles likewise can provide directions. Normally, directions are calculated from an edge-weighted directed graph that represents a map. Specifically, a map may be represented as a set of nodes, directed edges between the nodes, and weights associated with each edge. Each node represents an intersection on the map. Each edge represents a path from one intersection to another, where an edge exists whenever a path between those intersections is believed to exist, and the weight associated with each edge is the cost (e.g., travel time) of traveling along the path. An algorithm such as Dijkstra's algorithm or A* can be used to find the lowest-cost path from one node to another in the graph. In this way, the graph can be used to calculate directions from point A to point B.

When providing directions in this way, certain problems can arise. First, the graph is generally constructed from existing maps or from analysis of large-scale photographs of the geography, and these data sources might not accurately provide information about connectivity. A map might show two roads intersecting, and yet it still might not be possible to turn from one road to another—e.g., because one road travels over the other on an overpass, or because local authorities have put up a "no turns" sign, or because traffic is so heavy that drivers in practice avoid making a turn at that intersection. For example, if one is in Manhattan and wants to travel from the corner of $11^{th}$ Avenue and $42^{nd}$ Street to the corner of $6^{th}$ Avenue and Central Park South, a graph might show that it is possible to travel East on $42^{nd}$ Street, then turn left on $6^{th}$ Avenue and continue North to Central Park. Such a route is theoretically possible in real life, but does not take into account the fact that New York City imposes a time restriction on making a left turn across $42^{nd}$ Street at $6^{th}$ Avenue, and that, even at times of day when the turn is allowed, it takes so long to make this turn due to heavy traffic that only very brave drivers will attempt it. In particularly well-known and pathological cases like the Manhattan intersection mentioned above, map providers may invest the resources to collect knowledge of these issues and to build that knowledge into their geographic models. However, there are many places where reality does not match what is shown on a map, and it is difficult to identify and model all such situations. The foregoing examples illustrate a connectivity problem: a connection between two roads appears to exist on a map, but in reality the connection does not exist, or exists only at certain times of day, or is so difficult to make that there is reason to avoid including the connection in a set of driving directions.

A second problem that arises is that the routes that can be traveled tend to change over time. New roads are added. Old roads are temporarily taken out of service for maintenance, or are realigned. Traffic patterns change, making it more difficult to travel routes that had once been easy to travel. New traffic restrictions are adding, making illegal to make turns that had once been allowed. It is difficult for map providers to keep up with these kinds of changes, since doing so involves expending resources to collect and analyze the information, and to add the information to the geographic models (graphs or otherwise) from which directions are calculated.

Additionally, edge-weighted directed graphs generally associate weights (costs) with edges on the graph—i.e., the path from one node to another. However, in real life, the most costly (e.g., time-consuming) part of a trip may be at the intersections, not on the straightaways. For example, in the Manhattan example above, it might take only a minute to drive down $42^{nd}$ Street, and another minute to drive up $6^{th}$ Avenue, but it might make five minutes to make the left turn from one road to the other (even at a time of day when that turn is allowed). In other words, an edge-weighted graph that does not take into account the cost of taking a particular branch from a particular node may end up discounting the cost of making a turn, thereby making the overall route seem less costly than it is in real life. But a driver who is looking for the fastest route from point A to point B might care very much about how long this turn will take.

The subject matter described herein treats the problem of providing driving directions as an information collection and retrieval problem. Information about routes that can actually be traveled is collected in real time, based on routes that people actually travel. Rather than building directions from an abstract model of a map that treats every intersection as a node in a graph, the subject matter models the set of known information as a set of routes that people have actually traveled, and builds a set of directions by piecing together a route from known overlapping routes.

Knowledge of the routes is collected from Global Positioning System (GPS) trails of devices that are carried by people, or that are built into their vehicles. (As noted above, in the interest of privacy some people might opt out of having their locations tracked, but many people are likely to agree to have their locations and movements tracked In some cases, incentives could be provided to encourage people to agree explicitly to this type of tracking.) Raw geographic coordinates from GPS-equipped devices over time are cross-referenced against a map, in order to convert this raw data into actual routes traveled by people. (E.g., a coordinate might be received every ten seconds; by comparing the change of coordinates over time with an actual map, it may be possible to determine the route that the person has traveled.) Routes that have been traveled are stored in a database. Along with the routes themselves, there may be information about the time of day at which the route was traveled, how long it took to travel the route, how many people were in the vehicle at the time the route was traveled, what type of vehicle was used, or any type of information. This information may be relevant in determining whether certain routes are crowded at certain times of day, or whether certain portions of the route are subject to time restrictions (e.g., no left turns from 9 a.m. to 5 p.m.), or whether certain portions of the route are subject to occupancy or vehicle-type restrictions (e.g., the route might involve a High Occupancy Vehicle (HOV) lane that calls for at least three people in a car, but where busses and single-person motorcycles are allowed). (While the foregoing example assumes that location information would be collected from GPS trails, it could also be collected through other technologies—e.g., WiFi localization, inertial sensors, triangulation, etc. As with GPS trails, such information could be collected pursuant to appropriate permission received from the user.)

Assuming the existence of some database that contains a set of known routes (such as one collected using the technique mentioned above), a system that provides directions may patch together a set of directions from existing routes. Routes are made up of "legs," which are segments between intersections. (An "intersection" in this case is a point where it is possible to turn in more than one direction.) If a person asks for directions between point A and point B, the system looks in the database to determine whether an actual route is known to exist between those two points. If such a route exists, then the route may be provided as the directions (although the system also might attempt to construct a lower-cost route from a set of smaller routes). In general, longer routes are considered more informative, since a longer route represents a larger set of decisions, made by an actual person, about how to get from one point to another. (One way to view this situation is that longer routes may be more reliable than routes pieced together from smaller routes in the same sense that a translation of an entire sentence from one language to another may be more accurate than a translation pieced together from individual words in the sentence.) Longer routes may also simplify and speed the routing process, since a longer route may cover a significant portion of the distance from one point to another, thereby reducing the amount of splicing that would have to be done if shorter routes are used. (Although it will be noted that a long route could have been traveled haphazardly by one person, so—in some cases—a route might not be considered authoritative unless it has been traveled by several people over time. Or, a long route might be considered authoritative as long as its legs have collectively been traveled as part of other shorter routes, thereby providing corroboration for the accuracy and/or wisdom of the long route.) However, if a route covering the entire distance from point A to point B is not available, the system may attempt to combine other routes.

In order to combine routes, the system looks for routes that overlap in at least one leg, and that have at least one turn in common. The condition that the routes have a turn in common is to ensure that the system does not include, in a set of directions, a turn from one route onto another that has not been verified in real life. Avoiding such turns avoids the problem, described above, of including a turn that appears to exist on a map, but that is either impossible or impractical to make in real life. Imposing the condition that routes to be joined have a turn in common ensures that turns included in the directions have been verified by real people to be possible and practical (at least in the example where the routes are derived from real-life trips that people have taken). (In some cases, the system might insist on two, or three, or n, sequential turns in common as a condition to join routes together, which may lead to more realistic routes. However, the subject matter herein is not limited to systems that use such conditions.)

As noted above, long routes may be considered more informative than short routes, so—when patching together a set of directions from known routes—the system may start with long routes (subject, possibly, to the condition that the legs of long routes be corroborated by having been traveled as part of other shorter routes), while using shorter routes to fill in gaps or connections to endpoints. For example, if one wants to travel from Berkeley, Calif. to Princeton, N.J., it would be possible to piece this route together by combining routes from Berkeley to Winnemucca, Nev.; then Winnemucca to Pocatello, Id.; then Pocatello to West Yellowstone, Mont.; Then West Yellowstone to Cody, Wyo.; etc. However, instead of piecing routes together in this way, in one example a system might look for longer routes from points near Berkeley to points near Princeton. Thus, the system might start with a route from San Francisco to New York, and might look for shorter routes from Berkeley to the nearest freeway entrance along the route, and from a freeway exit to Princeton. If, say, there is no known route from Berkeley to a nearby freeway entrance, then the system might look for even finer-grained routes—e.g., from downtown Berkeley to Shattuck Avenue in Berkeley, and then from Shattuck Avenue to I-580. In general, the system might start with longer routes, and then search for successively finer-grained routes to patch in, until a complete set of directions from point A to point B is created.

Turning now to the drawings, FIG. 1 shows an example map 100 on which routes can be traveled. Map 100, in this example, is shown as a rectangular grid with streets at right angles. However, it will be understood that a map could show any set of streets that follow paths of any shape, and that intersect in any manner.

Map 100 has numbered streets horizontally ($1^{st}$ Street through $7^{th}$ Street), and lettered street vertically (A Street through G Street). Known routes along these streets are shown with the darker, thick lines along the streets. As noted above, these routes may be "known" in the sense that a person has actually been observed to travel along these routes. However, a route could be known through some mechanism other than actual observation of a person traveling the route. The routes shown in FIG. 1 demonstrate various properties of the routes, and of the map on which the route exists. These properties are described below.

Route 102 is a route that starts at the corner of $6^{th}$ and A Streets, and ends at the corner of $7^{th}$ and B Streets. Route 102 has two legs 104 and 106. A "leg" is a portion of a route for which there is no possibility of turning off the route. Thus, leg 104 covers the portion of route 102 that runs from the corner of $6^{th}$ and A Streets to the corner of $6^{th}$ and B Streets. Since there is no intersection between those two corners, the portion of route 102 between those two corners is a leg. Similarly, since there is no intersection between the corner of $6^{th}$ and B Streets and the corner of $7^{th}$ and B Streets, that portion of route 102 is also a leg (leg 106). Similarly, route 108 is a three-leg route containing legs 110, 112, and 114. Although route 108 does not appear to make any "turns" (it proceeds straight down $6^{th}$ Street), route 108 is considered to have "turns" in the sense that it crosses two intersections where the traveler has to make a decision about where to go. E.g., since it may be possible at the intersection of $6^{th}$ and D Streets to turn left, turn right, or go straight, the decision to continue through the intersection straight on $6^{th}$ Street is understood as a "turn". The two such intersections along route 108 divide the route into three legs.

Just as traveling straight through an intersection can be interpreted as a "turn", a route that proceeds through a physical corner can be understood as a non-turn. For example, route 116 proceeds down G Street and then proceeds through a 90-degree angle at the corner of Null Street. However, since G Street ends and Null Street begins at the point of this 90-degree angle, proceeding through this angle is not considered to be a "turn" for the purpose of determining how many legs are on a route, since a person traveling down G Street to Null Street has no choice but to turn left onto Null Street.

Various other routes are also shown. Route 118 proceeds from the corner of $1^{st}$ and A Streets to the corner of $3^{rd}$ and C Streets. For reasons described above, the intersections at $1^{st}$ and B, $1^{st}$ and C, and $2^{nd}$ and C, are all considered to be turns. There being three such intersections, route 118 is a four-leg route. Route 120 is a five-leg route that proceeds from $1^{st}$ and C Streets to $4^{th}$ and E Streets. Route 122 is a six-leg route that proceeds from $3^{rd}$ and D Streets to $5^{th}$ and F Streets. Route 124 is a seven-leg route that proceeds from $1^{st}$ and C Streets to $5^{th}$ and F Streets. These routes are used below to demonstrate various aspects of how known routes may be combined to provide a set of directions.

Suppose that routes 102, 108, 116, 118, 120, 122, and 124 are stored in a database, and a person has asked for directions from point X (the corner of $1^{st}$ and A) to point Y (the corner of $5^{th}$ and F). It will be observed that there is no single known route that actually runs from point X to point Y. However, a system that is processing this request (e.g., an auto navigation system, or a web site such as BING Maps) may attempt to combine existing routes to create directions from X to Y. The system might first try to combine the first two legs of route 118 with all of route 124. However, routes 118 and 124 have no legs or turns in common. As discussed above, in one example the subject matter herein may avoid creating turns that have not been verified in real life, so the system may avoid combining these routes. While the routes might appear to have an intersection in common (i.e., the corner of $1^{st}$ and C Streets), this intersection does not represent a turn in common, since these routes do not show someone proceeding along $1^{st}$ Street straight through the intersection at C Street. In other words, proceeding straight through C Street is not part of a route that is "known" to the system, since there is no evidence that anyone has traveled this route. (For example, there might be a concrete barrier at that intersection that prevents proceeding straight, although such a barrier is not apparent from the map.)

A system might also try to join routes 118, 120, and 124. As can be seen, routes 118 and 120 have two overlapping legs (the leg from $1^{st}$ and C to $2^{nd}$ and C, and also the leg from $2^{nd}$ and C to $3^{rd}$ and C). However, while it might appear as if the end of route 124 can pick up where route 120 terminates, it will be noted that routes 120 and 124 have no legs and no turn in common. Rather route 120 ends perpendicular to route 124 at the corner of $4^{th}$ and E Streets, so there is no known route that includes a turn from $4^{th}$ St to E Street. Thus, route 124 cannot be added to the combination of routes 118 and 120. However, route 122 does have two legs in common with route 120—i.e., the leg from $3^{rd}$ and D to $4^{th}$ and D, and also the leg from $4^{th}$ and D to $4^{th}$ and E. Thus, a route from X to Y can be constructed by combining portions of routes 118, 120 and 122. It will be noted that the route generated by combining routes 118, 120, and 122 appears to be circuitous, since it involves going from $5^{th}$ Street to $6^{th}$ Street along E Street, and then back down F Street from $6^{th}$ to $5^{th}$. However, this route can be shortened somewhat by combining route 122 with route 124. Since routes 122 and 124 have a leg in common (the leg from $4^{th}$ and E to $5^{th}$ and E), it might be possible to combine route 122 with the last two legs of route 124 to avoid having to take this circuitous route. (However, some implementations might insist that two routes have more than one leg in common before combining the two routes. Routes that have a larger number of legs in common might result in real-life trips that feel smoother and less "choppy," since such routes have multiple-leg stretches that were actually traveled by people.)

If a set of directions is created from routes 118, 120, 122, and 124, then the complete directions from point X to point Y are shown with the dotted-and-dashed line (line 126). These directions, which are constructed by splicing together a set of known routes, may be provided to a requester as a way of getting from point A to point B. In this way, the problem of providing directions reduces to the problems of retrieving the right combination of routes from a database of known routes, and following certain rules to splice those routes together.

It is noted that the routes shown in the example of FIG. 1 are directional, as indicated by the arrows. For example, route 102 is a route that runs from the corner of $6^{th}$ and A Streets to the corner of $7^{th}$ and B Streets. It is not a route that runs in the reverse direction from the corner of $7^{th}$ and B Streets to the corner of $6^{th}$ and A Streets. One aspect of the subject matter herein is to leverage information about routes that people have actually traveled, and traveling a route in one direction may present different issues from traveling that route in the opposite direction. (E.g., streets might be one-way, or certain turns might be illegal depending on the direction of the turn and which way one is traveling.) However, the subject matter herein is not limited to directional routes, and includes systems that use non-directional routes.

Figure 2:
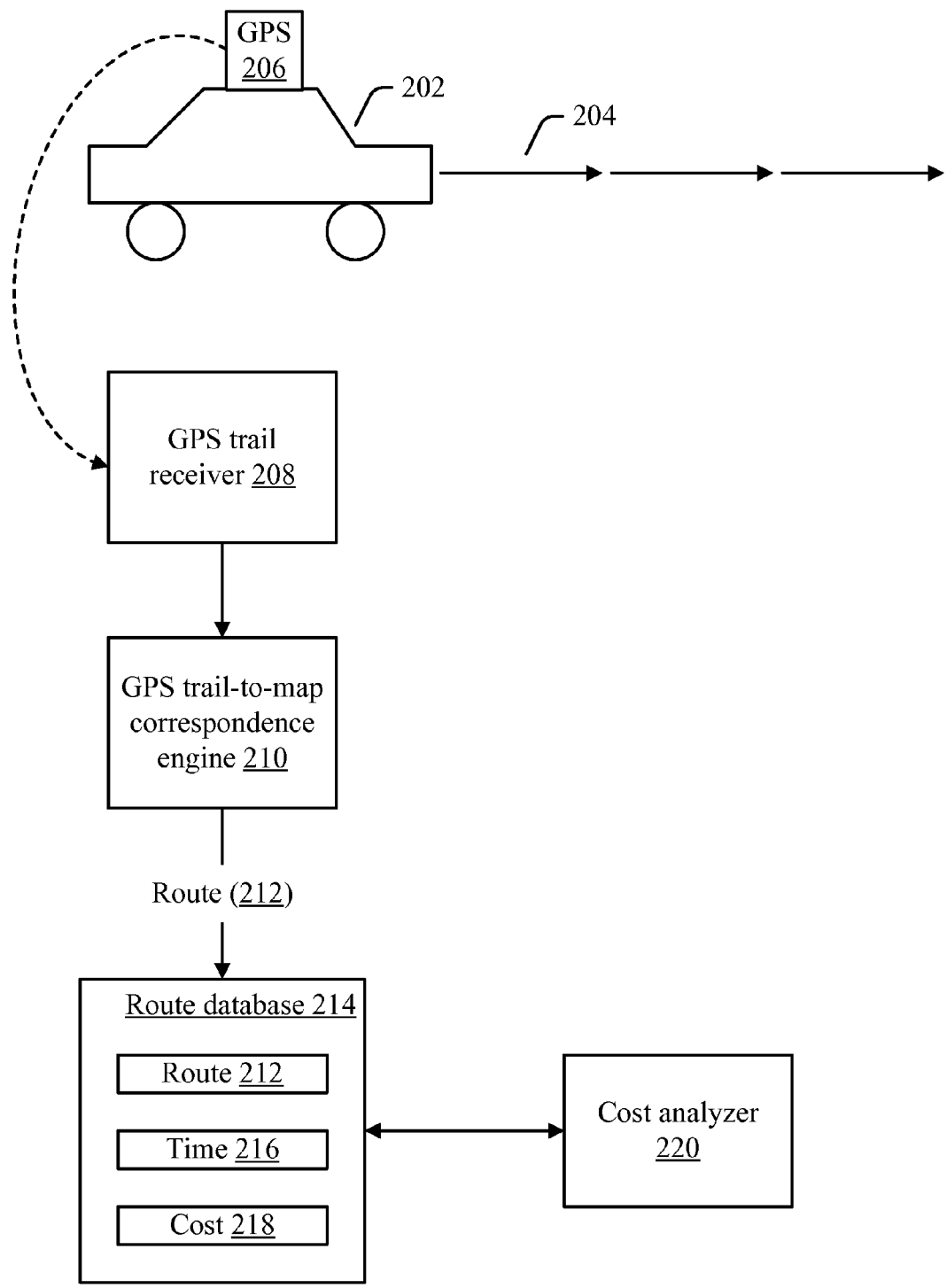
FIG. 2 is a block diagram of an example set of components that may be used to build a database of known routes.

FIG. 2 shows an example set of components that may be used to build a database of known routes. The example of FIG. 2 shows the database being built from routes that people have actually traveled. However, as noted above, certain aspects of the subject matter herein are not limited to the case in which known routes are collected in this way.

In FIG. 2, vehicle 202 travels along a route (as indicated by arrows 204). Vehicle 202 is shown, by way of example, as a car, although vehicle 202 could be any type of vehicle—e.g., bus, truck, motorcycle, bicycle, etc. Moreover, while the example of FIG. 2 shows the route being traveled by a vehicle, in another example a route could be traveled by a pedestrian who moves without any type of vehicle.

Vehicle 202 is equipped with a GPS device 206. GPS device 206 may be a portable navigation box, a dashboard-mounted navigation console, a smart phone equipped with a GPS receiver, or any other type of device. GPS device 206 can determine its current location on the globe and can transmit the coordinates of that location to a receiver. (As noted above, in the interest of privacy a person might choose not to have his or her location tracked and transmitted, but some people will choose voluntarily to allow their location to be transmitted.) GPS device 206 transmits its information (e.g., via a cell phone network) to GPS trail receiver 208.

The information that GPS trail receiver 208 receives may be a stream of coordinates spread out over some period of time. For example, GPS trail receiver 208 might receive a coordinate every ten seconds, during the entire time that vehicle 202 is traveling. Using these coordinates, it is possible to determine what route was traveled by vehicle 202, how long that route took to travel, and even how long specific portions of the route took to travel. GPS trail receiver may provide this information to GPS trail-to-map correspondence engine 210, which acts as a creator of routes based on GPS trails. Since coordinates are simply raw location data (e.g., latitude and longitude coordinates), engine 210 may apply these coordinates to an actual map in order to determine what routes were traveled by vehicle 202. For example, GPS trail receiver may find that vehicle 202 was in the following locations at the following times:

| Time | Location |
|---|---|
| 1:00:00 | 47.606622, −122.333407 |
| 1:00:10 | 47.607342, −122.334035 |
| 1:00:20 | 47.608785, −122.335392 |

However, engine 210 may determine that these times and coordinates indicate that vehicle 202 is traveling north on $4^{th}$ Street in Seattle between Madison and Union Streets.

Once engine 210 has determined which actual route 212 corresponds to the GPS trail, engine 210 may store route 212 in route database 214. Route database 214 may contain each route 212 that has been identified from the GPS trail of vehicle 202 (and from numerous other vehicles). Moreover, for each route, database 214 may store time information 216 and/or cost information 218. Time information 216 indicates the time at which the route was observed, and how long it took to travel. As discussed above, some routes might be available at some times of day but not at others (e.g., there might be a restriction against making a left turn during rush hour, or certain lanes might switch direction between morning and evening rush hour). Thus, in creating a set of directions from known routes, it may be relevant to know at what time the routes were observed. Cost information 218 may indicate the cost of traveling a particular route. That cost may be based on time (e.g., routes that take a long time to travel may be viewed as having a higher "cost" than routes that can be traveled in less time). However, cost could also be based on other factors—e.g., distance, speed limit, existence of known speed traps, whether tolls exist, or any other information. The cost of traveling a route may be determined by cost analyzer 220, which may take these factors (or other factors) into account, and may determine cost information 218 for any given route.

Figure 3:
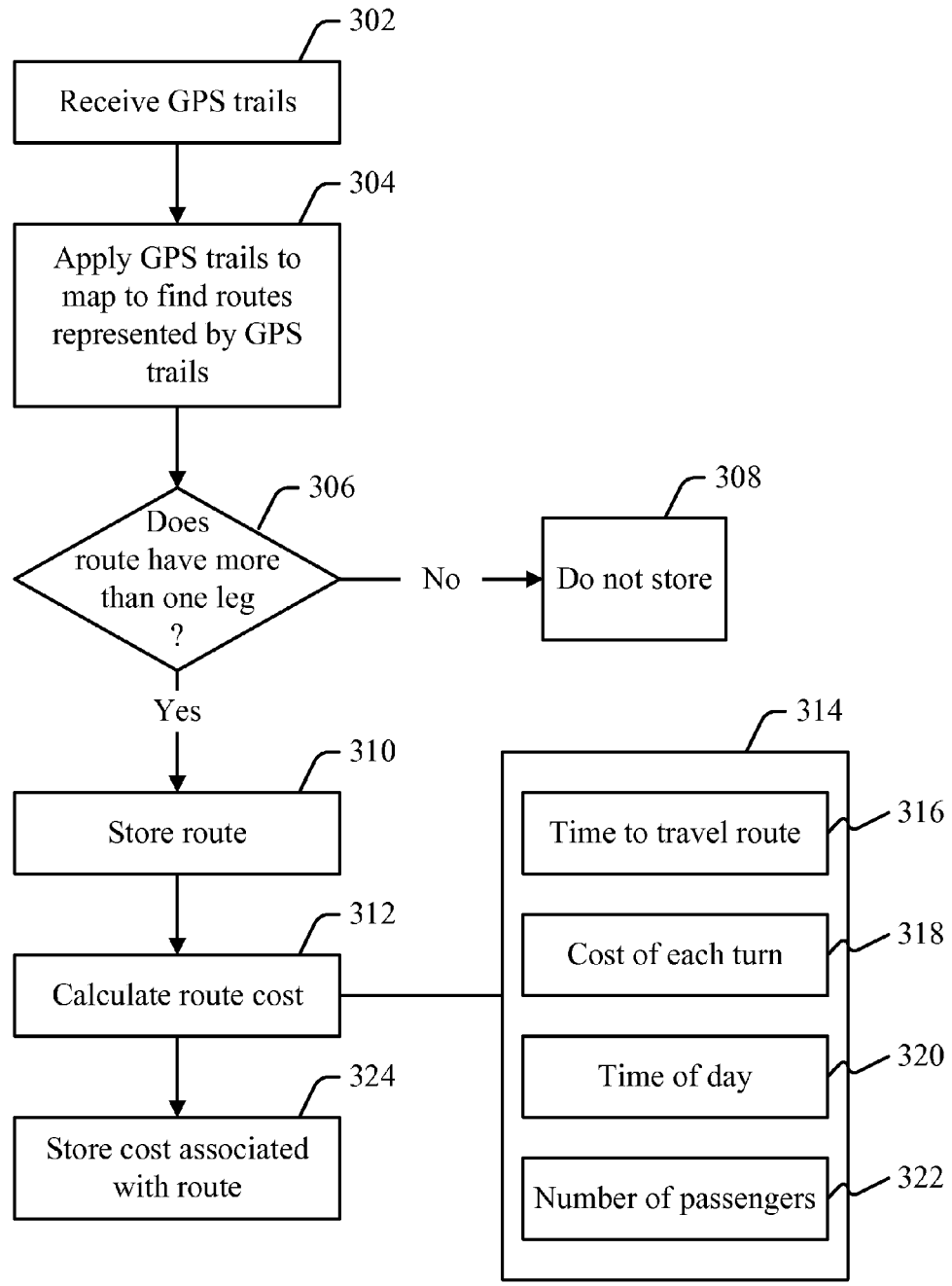
FIG. 3 is a flow diagram of an example process of building a database of routes based on GPS trails.
Figure 4:
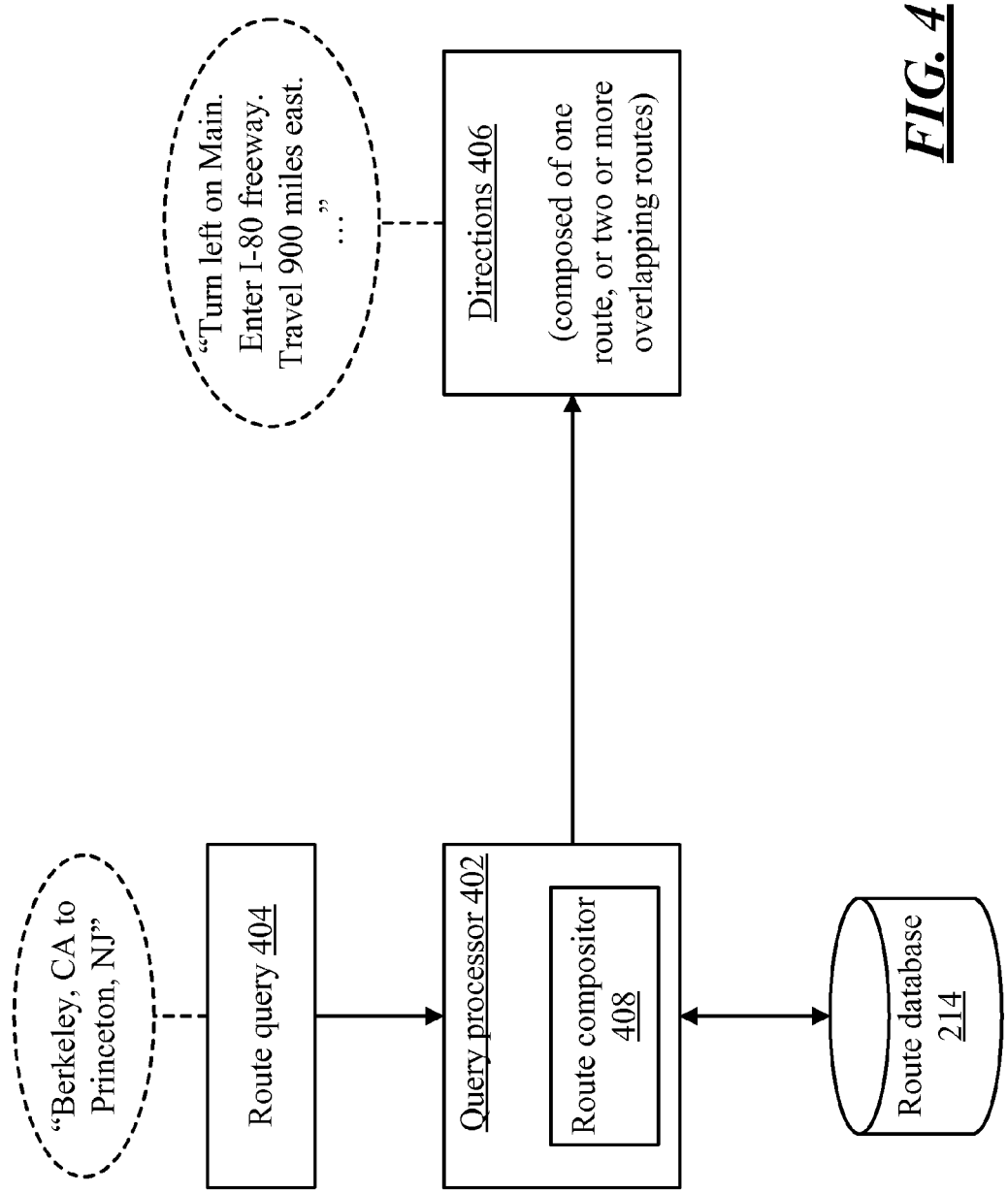
FIG. 4 is a block diagram of an example system that may be used to respond to route queries.
Figure 5:
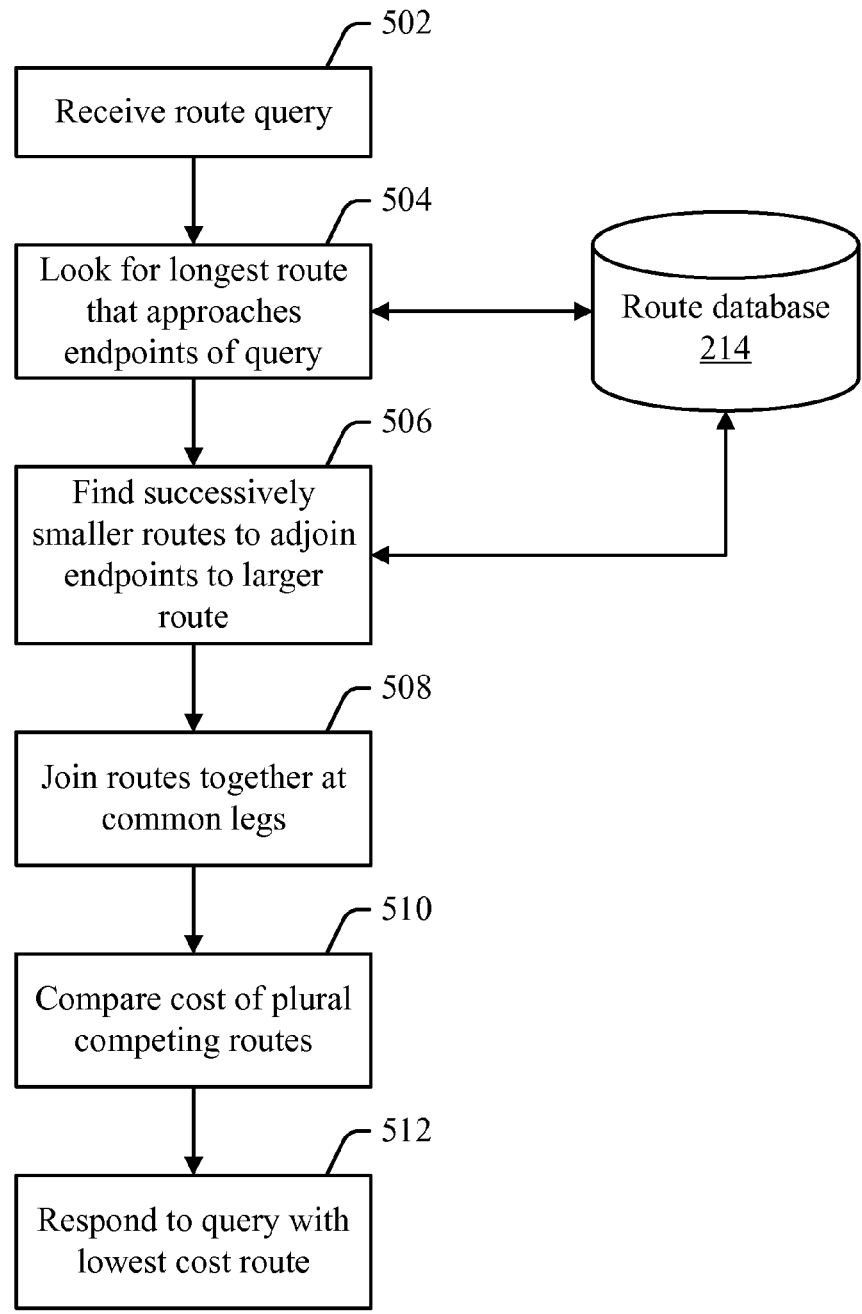
FIG. 5 is a flow diagram of an example process of responding to a route query by retrieving existing known routes.

FIG. 3 shows, in the form of a flow chart, an example process of building a database of routes based on GPS trails. Before turning to a description of FIG. 3, it is noted that the flow diagrams contained herein (both in FIG. 3 and in FIG. 5) are described, by way of example, with reference to components shown in FIGS. 1, 2, and 4, although these processes may be carried out in any system and are not limited to the scenarios shown in FIGS. 1, 2, and 4. Additionally, each of the flow diagrams in FIGS. 3 and 5 shows an example in which stages of a process are carried out in a particular order, as indicated by the lines connecting the blocks, but the various stages shown in these diagrams can be performed in any order, or in any combination or sub-combination.

At 302, GPS trails may be received. At 304, GPS trails may be applied to a map in order to obtain routes that are represented by the GPS trails—e.g., coordinates, and the time at which those coordinates are received, may be analyzed to determine what road(s) were traveled by a GPS device that reports those coordinates, when the roads were traveled, and in which direction.

At 306, is it determined whether the route has more than one leg. As noted above, a leg is a segment of a route in which there are no possible turns. A route with only one leg is one that cannot be combined with other routes, since a one-leg route contains no way to turn onto a different route. Thus, if the route does not have more than one leg, the route is not stored (at 308). On the other hand, if the route does have more than one leg, then, at 310, the route is stored in a database.

For each stored route, a cost associated with that route may be calculated (at 312). The cost may be based on various factors. Some examples of those factors 314 are shown in FIG. 3.

One example factor is the time that it takes to travel the route (block 316). Assuming that people tend to seek the fastest route from one place to another, a route that takes longer to travel may be viewed as having a higher cost than a route that takes less time to travel. Another factor that may be considered is the time associated with each turn in the route (block 318). Since traveling down a straight road (in the absence of traffic) can be relatively quick, much of the time spent traveling a route may be spent in the turns. Thus, it may be relevant to know how time-costly the turns are. Additionally, since portions of routes may be combined together to create a set of directions, it may be relevant to know how much time it takes to make a particular turn, separate and apart from the overall cost of traveling the route, since the cost of a turn determines how costly it is to splice two routes together. Thus, the time that it takes to make turns in the route may be taken into account in calculating the overall cost, and may also be stored separately from the overall cost.

Another factor that may be taken into account is the time of day at which the route was traveled (block 320). For example, if a route was traveled at 3:00 a.m. and took twenty minutes to travel, this fact may be viewed differently in the cost calculation than if it had taken twenty minutes to travel the route at 5:00 p.m., since one would expect that there would be more traffic at 5:00 p.m. Thus, the time of day at which the route was actually traveled may be taken into account in determining the overall cost of the route. In some cases, different costs may be calculated for different times of day, since the time of day at which travel is occurring can be highly relevant in determining what route to recommend to a person.

Another factor that may be taken into account is the number of passengers in the vehicle at the time the route was observed (block 322). (This information might be self-reported by the driver of the vehicle.) The reason that the number of passengers might be relevant is that some lanes have occupancy restrictions (e.g., SR-520 in Washington has an HOV lane that only cars with at least three passengers can use), and some roads that charge tolls offer a discount based on the number of passengers in the vehicle (e.g., cars with at least three passengers pay $2 to cross the Lincoln Tunnel eastbound, instead of the normal $8 toll). Thus, the cost may be based on how many passengers are in the vehicle. Being able to use an HOV lane during rush hour may significantly reduce the time it takes to travel a route, and reducing the amount of a toll reduces the cost of a trip in other way. Thus, in some cases, different costs of a route may be calculated for different numbers of people in the vehicle.

The foregoing is a list of example factors associated with the cost of a route, which may also be used to determine what routes to recommend. However, other factors may be considered, such as whether a driver is a local resident or a visitor to the area (visitors may tend to prefer simpler routes than locals), or the type of vehicle (tall vehicles may have difficulty going under certain overpasses; long vehicles may have difficulty making certain turns; commercial trucks may have to stop at weigh stations).

At 324, the calculated cost may be stored. It is noted that the cost may be a number, but could also be a function that is used to generate a number based on certain variables. For example, if the cost of traveling a route is based on the time of day at which the route is traveled (t) and/or the number of people in the vehicle (n), the "cost" might actually be a function, such as $C(t,n)$, which takes into account the time and the occupancy of the vehicle in determining the cost to travel a route. Other types of costs could be calculated, depending on circumstances and context—e.g., on a shopping trip, a large number of stops might be interpreted as a decrease in the cost of the trip (even if the stops make the trip take longer), since a shopping trip in which a person visits many stores might be considered more efficient than a shopping trip in which the person travels down roads quickly without making any stops.

Once a database of routes has been created, those routes can be used to respond to route queries. (However, as noted above, techniques described herein may be used to respond to route queries regardless of whether the database of known routes is created from actual GPS trails, or is created in some other manner.) FIG. 4 shows an example system that may be used to respond to route queries.

Query processor 402 receives route query 404. An example route query is "Berkeley, Calif. to Princeton, N.J.", which is the form in which such a query might be entered into a map web site. However, a query could take any form, such as entering a destination into a navigation box, which effectively constitutes a query for directions from the navigation box's current location to whatever the destination is (so that the current location and the specified destination are treated as the two endpoints of the query).

Known routes are stored in route database 214. Thus, query processor 402 may consult route database 214 to determine what known routes can be used to respond to query 404. If there is a route in route database 214 that runs between the endpoints specified in query 404, then this route may be retrieved, and may be provided as directions 406. (As shown in FIG. 4, an example of directions 406 is "Turn left on Main. Enter I-80 Freeway. Travel 900 miles east . . . .")

Query processor 402 may include a route compositor 408, which constitutes software and/or hardware that can piece together routes in database 214 to compose a new route. If there is no route between the query's endpoints in route database 214, then route compositor 408 may construct a route from existing known routes, and this constructed route may be provided as directions 406. Route compositor 408 may construct such a route using techniques that are described above in connection with FIG. 1, and that are also described in additional detail in connection with FIG. 5 below.

FIG. 5 shows an example process of responding to a route query by retrieving existing known routes. At 502, a route query (e.g., "Berkeley, Calif. to Princeton, N.J.") may be received. At 504, the process may look, in route database 214, for the longest route that approaches the endpoints of the query. In some cases, route database 214 will actually contain a route between the two endpoints in the query, in which case the process can simply respond by providing this route in the form of a set of directions. However, in many cases, route database 214 will not contain a route that exactly matches the endpoints in the query. In this case, the process of FIG. 5 attempts to construct a route between those endpoints from other routes.

In order to construct such a route, the process may consider the length of existing routes by first attempting to find a long route that runs from a place near the starting point in the query to a place near the query's ending point. For example, with reference to the Berkeley-to-Princeton query, San Francisco is near Berkeley and New York is near Princeton. If database 214 contains a San Francisco-to-New York route, then such a route may be used as a basis to construct the Berkeley-to-Princeton route. The San Francisco-to-New York route may be chosen as a starting point; the choice of San Francisco-to-New York, in this example, is made specifically because of the proximity of the starting and ending points of that route to the endpoints specified in the query. A long route that exists in a database may be considered particularly reliable, since it represents a person's actual choice about how to travel from one point to another. Thus, the process of FIG. 5 may start by looking for long routes, and may use shorter routes to fill in gaps. Thus, the one or more routes that are retrieved from database are routes that run, either alone or in combination, from one endpoint named in the route query to the other endpoint.

Therefore, once a long route has been chosen, at 506 the process looks for successively smaller routes to adjoin the endpoints to the larger route. For example, when the long San Francisco-to-New York route has been chosen as the basis to construct a Berkeley-to-Princeton route, the process may look for routes that run from Berkeley to intersections on the long route, and other routes that run from intersections on the long route to Princeton. If no routes between Berkeley and intersections on the San Francisco-to-New York route exist, the process may look for successively smaller routes to construct such a route. As described above, one example rule that may govern the process of choosing routes is to join two routes only if the routes' degree of overlap satisfies some standard (e.g., if they have some number of legs in common, and if there is a turn from one route onto the other route).

Once routes with common legs have been identified, these routes may be joined together at the common legs (at 508). The process of finding routes may be performed repeatedly, and several routes may be created. At 510, the cost of these competing routes may be compared. At 512, the process may respond to the query that was received at 502 by providing directions based on the lowest-cost route.

Figure 6:
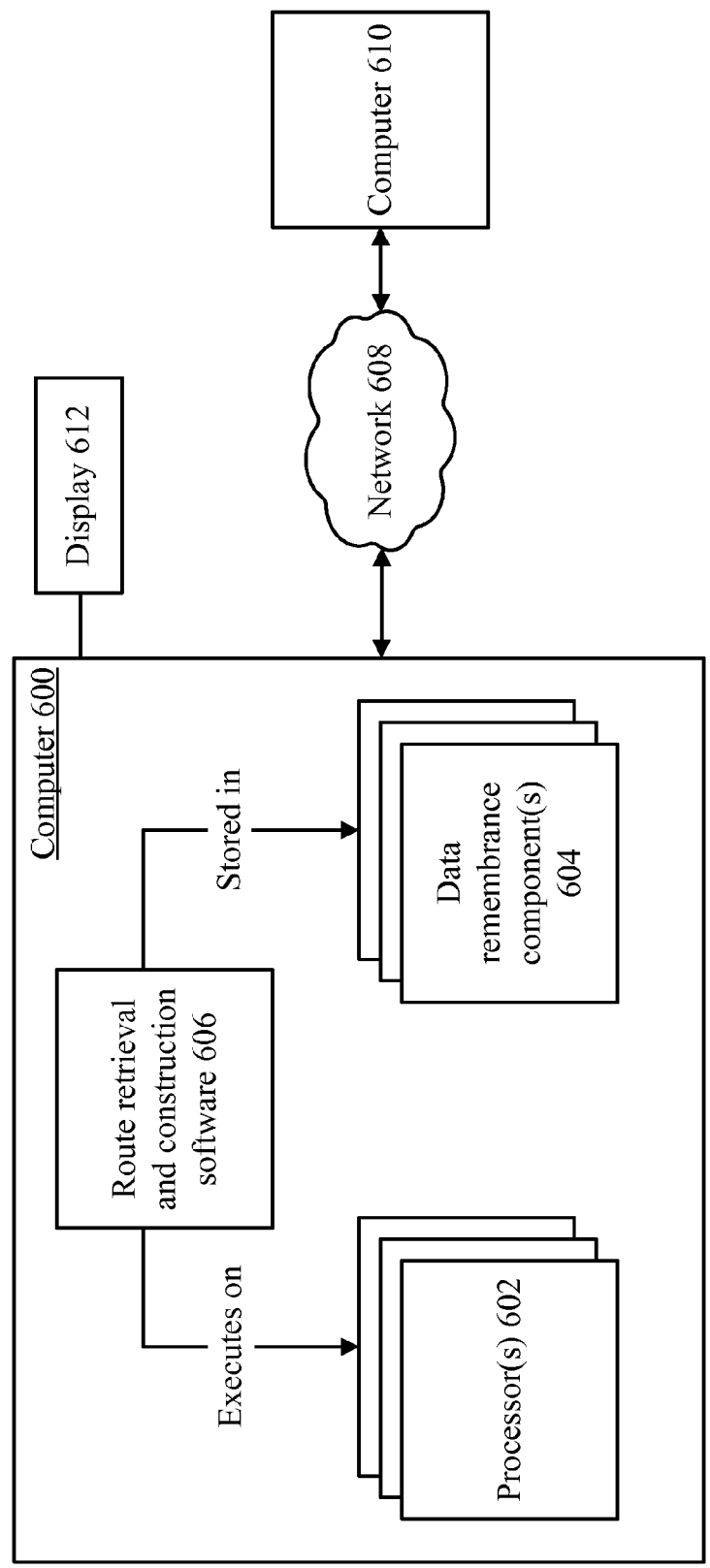
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is route retrieval and construction software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media or computer-readable storage memories. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing directions, the method comprising:
   obtaining a first plurality of routes that people have traveled by collecting Global Positioning System (GPS) data and applying said GPS data to a map;

storing said first plurality of routes in a database; and
using a processor to perform acts comprising:
  receiving a query that indicates a first endpoint and a second endpoint;
  searching said database for a second plurality of routes that, in combination, run from said first endpoint to said second endpoint;
  retrieving said second plurality of routes from said database;
  creating a set of directions based on said second plurality of routes by combining two or more routes that overlap in one or more segments; and
  providing said set of directions to a person.

2. The method of claim 1, said acts further comprising:
combining together said second plurality of routes to create a complete route from said first endpoint to said second endpoint, said combining being governed by a rule that specifies an amount of overlap that routes are to have in order to be combined together.

3. The method of claim 2, said rule specifying a number of legs that routes are to have in common in order to be combined together, each leg being a portion of a route with no turns.

4. The method of claim 1, said set of directions including only turns that have been taken as part of a route in said database.

5. The method of claim 1, each route in said database being associated with a cost that takes into account a time of day at which the route was traveled or a number of people in a vehicle in which the route was traveled, said acts further comprising:
  choosing which of said second plurality of routes to use in said directions based on said cost and based on either a time of day at which said query is received or a number of people in a vehicle in which the directions will be used.

6. The method of claim 1, wherein said searching comprises:
  searching for routes based on length of the routes by looking first for longer routes, and then looking for successively shorter routes.

7. The method of claim 1, wherein said searching comprises:
  finding, in said database, a first route based on proximity between said first route's starting point and said first endpoint, and based on proximity between said first route's ending point and said second endpoint;
  finding, in said database, a second route from said first endpoint to an intersection along said first route; and
  finding, in said database, a third route from an intersection along said first route to said second endpoint.

8. One or more computer-readable storage media that store executable instructions to provide directions, the executable instructions, when executed by a computer, causing the computer to perform acts comprising:
  receiving a query that indicates a first endpoint and a second endpoint;
  retrieving a plurality of routes;
  combining said plurality of routes by joining together routes that have a degree of overlap specified by a rule to create a complete route, said rule specifying a number of legs that routes are to have in common in order to be joined together;
  creating a set of directions based on said complete route; and
  providing said set of directions to a person.

9. The one or more computer-readable storage media of claim 8, said routes being obtained from GPS trails of routes that have been traveled, said routes being stored in a database, wherein said retrieving retrieves said routes from said database.

10. The one or more computer-readable storage media of claim 8, wherein creating of said complete route comprises:
  using, in said complete route, only turns that have been observed in routes that have been traveled.

11. The one or more computer-readable storage media of claim 8, said plurality of routes being routes obtained from GPS trails of actual routes that have been traveled, each of said plurality of routes being associated a cost, wherein said combining takes into account said cost, and wherein said cost is based on a time of day at which each route was traveled.

12. The one or more computer-readable storage media of claim 8, said plurality of routes being routes that are obtained from GPS trails of actual routes that have been traveled, each of said plurality of routes being associated a cost, wherein said combining takes into account said cost, and wherein said cost is based on a number of people who were in a vehicle when each route was traveled.

13. The one or more computer-readable storage media of claim 8, wherein said retrieving comprises:
  searching for routes based on length of the routes by looking first for longer routes, and then looking for successively shorter routes.

14. A system for providing directions, the system comprising:
  a Global Positioning System (GPS) trail receiver that receiving GPS trails from devices;
  a route database;
  a route creator that identifies, based on said GPS trails, routes that have been traveled and that stores said routes in said route database;
  a memory;
  a query processing component that is stored in said memory, that receives a route query comprising a first endpoint and a second endpoint, that retrieves, from said database, a plurality of overlapping routes that collectively run from said first endpoint to said second endpoint; and
  a route compositor that joins said overlapping routes together based on which ones of said overlapping routes satisfy a rule governing a degree of overlap in order to create a complete route from said first endpoint to said second endpoint, said rule specifying a number of legs that said routes are to have in common in order to be joined, wherein said query processing component provides a set of directions to a person based on said complete route.

15. The system of claim 14, wherein said route compositor includes, in said complete route, only turns that have been made in routes created from said GPS trails.

16. The system of claim 14, wherein said route compositor, in determining which routes to use in said complete route, takes into account a cost of each of said routes, said cost being based on a time of day at which said route was traveled or a number of people in a vehicle in which said route was traveled.

17. The system of claim 14, wherein said query processing component searches for said routes based on length of the routes by looking first for longer routes, and then looking for successively shorter routes.

18. The system of claim 14, wherein said query processor finds, in said database, a first route based on proximity between said first route's starting point and said first endpoint, and based on proximity between said first route's ending point and said second endpoint, wherein said query processor finds, in said database, a second route from said first endpoint to an intersection along said first route, and wherein said query processor finds, in said database, a third route from an intersection along said first route to said second endpoint.

19. The one or more computer-readable storage media of claim 8, said rule specifying that said routes overlap in more than one leg in order to be joined.

20. The system of claim 14, said rule specifying that said routes overlap in more than one leg in order to be joined.

* * * * *